United States Patent
Stewart et al.

(10) Patent No.: US 9,800,298 B2
(45) Date of Patent: Oct. 24, 2017

(54) EVOLVED DISTRIBUTED ANTENNA SYSTEM

(71) Applicant: CommScope Telecommunications LLC, Hickory, NC (US)

(72) Inventors: Kenneth Anderson Stewart, Sunnyvale, CA (US); Larry G. Fischer, Waseca, MN (US)

(73) Assignee: CommScope Technologies LLC, Hickory, NC (US)

( * ) Notice: Subject to any disclaimer, the term of this patent is extended or adjusted under 35 U.S.C. 154(b) by 73 days.

(21) Appl. No.: 14/554,531

(22) Filed: Nov. 26, 2014

(65) Prior Publication Data

US 2015/0078258 A1 Mar. 19, 2015

Related U.S. Application Data

(62) Division of application No. 13/538,170, filed on Jun. 29, 2012, now Pat. No. 8,929,288.

(Continued)

(51) Int. Cl.
*H04W 4/00* (2009.01)
*H04B 7/024* (2017.01)
(Continued)

(52) U.S. Cl.
CPC .............. *H04B 7/024* (2013.01); *H04B 7/022* (2013.01); *H04W 88/085* (2013.01); *H04B 7/0691* (2013.01); *H04B 7/0874* (2013.01)

(58) Field of Classification Search
None
See application file for complete search history.

(56) References Cited

U.S. PATENT DOCUMENTS 7,493,129 B1 * 2/2009 Mostafa .............. H04W 88/085
455/502
7,668,153 B2 2/2010 Zavadsky
(Continued)

FOREIGN PATENT DOCUMENTS

WO 2009138876 11/2009

OTHER PUBLICATIONS

State Intellectual Property Office of the People's Republic of China, "Decision of Rejection for CN Application No. 201280032240.9", "Foreign Counterpart to U.S. Appl. No. 13/538,170", Apr. 12, 2017, pp. 1-14, Published in: CN.

(Continued)

*Primary Examiner* — Ayaz Sheikh
*Assistant Examiner* — Sori Aga
(74) *Attorney, Agent, or Firm* — Fogg & Powers LLC (57) ABSTRACT

One embodiment is directed to a method for generating and distributing wireless RF signals at a host unit in a distributed antenna system. At least a first subset of IP data from an IP network entity is routed to a first base transceiver station within the host unit, and at least a second subset of the IP data is routed to a second base transceiver station within the host unit. The IP data is baseband processed by the first and second base transceiver stations to generate a first digital representation of a first RF signal and a second digital representation of a second RF signal. The first digital representation of the first RF signal is routed to a first subset of the plurality of remote units and the second digital representation of the second RF signal is routed to a second subset of the plurality of remote units.

20 Claims, 4 Drawing Sheets

Related U.S. Application Data (60) Provisional application No. 61/502,556, filed on Jun. 29, 2011.

(51) Int. Cl.
| | | |
|---|---|---|
| *H04W 88/08* | (2009.01) | |
| *H04B 7/022* | (2017.01) | |
| *H04M 1/00* | (2006.01) | |
| *H04B 7/06* | (2006.01) | |
| *H04B 7/08* | (2006.01) | |

(56) References Cited

U.S. PATENT DOCUMENTS

| | | | |
|---|---|---|---|
| 7,787,854 B2 | 8/2010 | Conyers et al. | |
| 2009/0005096 A1 | 1/2009 | Scheinert | |
| 2010/0093391 A1* | 4/2010 | Saban | H04B 7/024 455/552.1 |
| 2010/0177759 A1 | 7/2010 | Fischer et al. | |
| 2010/0178936 A1 | 7/2010 | Wala et al. | |
| 2011/0244785 A1 | 10/2011 | Scheinert | |
| 2012/0093084 A1* | 4/2012 | Wala | H04B 1/18 370/328 |
| 2012/0281622 A1 | 11/2012 | Saban et al. | |

OTHER PUBLICATIONS

Chinese Patent Office, "First Office Action for CN Application No. 201280032240.9", "from Foreign Counterpart to U.S. Appl. No. 13/538,170", Oct. 29, 2015, pp. 1-27, Published in: CN.

European Patent Office, "Extended European Search Report for Application Serial No. 12804645.5", "from Foreign Couterpart to U.S. Appl. No. 14/554,531", Feb. 5, 2015, pp. 1-14, Published in: EP.

China Patent Office, "Second Office Action for CN Application No. 201280032240.9", "from Foreign Counterpart to U.S. Appl. No. 13/538,170", Jun. 29, 2016, pp. 1-18, Published in: CN.

The International Bureau of WIPO, "International Preliminary Report on Patentability from PCT Application No. PCT/US2012/044916 mailed Jan. 16, 2014", "from PCT Counterpart of U.S. Appl. No. 13/538,170", Jan. 16, 2014, pp. 1-6, Published in: CH.

International Searching Authority, "International Search Report", "from Foreign Counterpart of U.S. Appl. No. 13/538,170", Jan. 17, 2013, pp. 1-9, Published in: WO.

* cited by examiner

EVOLVED DISTRIBUTED ANTENNA SYSTEM

CROSS-REFERENCE TO RELATED APPLICATIONS

This application is a divisional of application Ser. No. 13/538,170 filed on Jun. 29, 2012, entitled "EVOLVED DISTRIBUTED ANTENNA SYSTEM" (currently allowed), which claims the benefit of U.S. Provisional Patent Application Ser. No. 61/502,556, filed on Jun. 29, 2011, both of which are hereby incorporated herein by reference.

BACKGROUND

One way that a wireless cellular service provider can improve the coverage provided by a given base station or group of base stations is by using a distributed antenna system (DAS). In a DAS, a representation of radio frequency (RF) wireless communication signals are communicated between a host unit and one or more remote units. The host unit generates a downlink transport signal that is distributed to one or more of the remote units. A remote unit can receive the downlink transport signal and reconstructs the downlink RF signals based on the downlink transport signal and causes the reconstructed downlink RF signals to be radiated from at least one antenna coupled to or included in the remote unit. A similar process is performed in the uplink direction. RF signals transmitted from mobile units (also referred to here as "uplink signals") are received at a remote unit. A remote unit uses the uplink signals to generate an uplink transport signal that is transmitted from the remote unit to the host unit.

One or more intermediary devices (also referred to here as "expansion hosts" or "intermediary devices") can be placed between the host unit and the remote units in order to increase the number of remote units that a single host unit can feed and/or to increase the host-unit-to-remote unit distance.

SUMMARY

One embodiment is directed to a method for generating and distributing wireless RF signals at a host unit in a distributed antenna system comprising the host unit which is communicatively coupled to a plurality of remote units. The method includes receiving Internet Protocol (IP) data at the host unit from an IP network entity, wherein the IP data corresponds to a plurality of radio frequency (RF) signals. At least a first subset of the IP data is routed to a first base transceiver station within the host unit, and at least a second subset of the IP data is routed to a second base transceiver station within the host unit. The at least a first subset of the IP data is baseband processed at the first base transceiver station to generate a first digital representation of a first RF signal for transmission from a remote unit to a wireless device, wherein the first digital representation of the first RF signal is at baseband. The at least a second subset of the IP data is baseband processed at the second base transceiver station to generate a second digital representation of a second RF signal for transmission from a remote unit to a wireless device, wherein the second digital representation of the second RF signal is at baseband. The first digital representation of the first RF signal is routed to a first subset of the plurality of remote units and the second digital representation of the second RF signal is routed to a second subset of the plurality of remote units as one or more downlink serial data streams.

DETAILED DESCRIPTION

Figure 1:
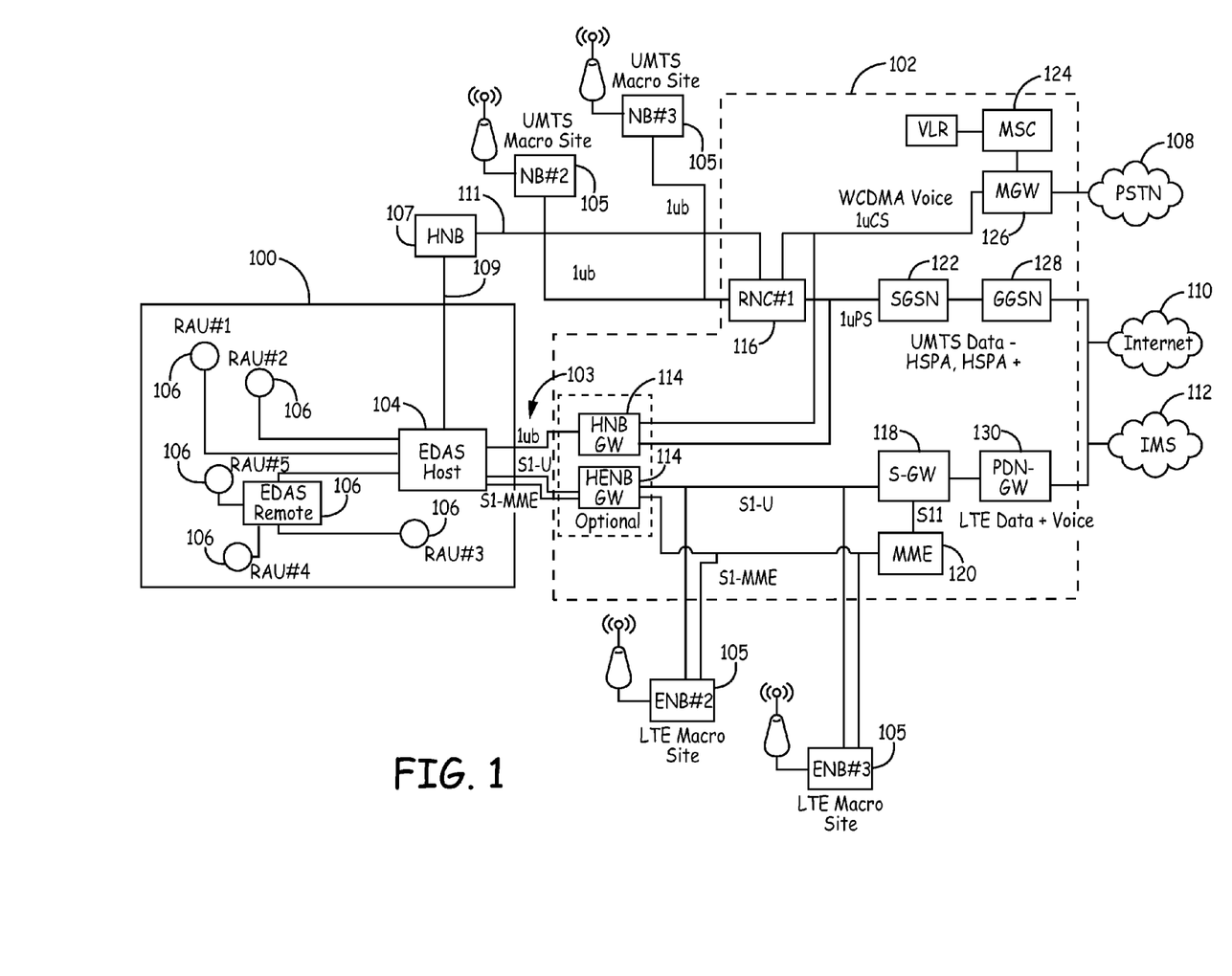
FIG. 1 is a high level block diagram of a wireless communication network including a distributed antenna system (DAS) with an integrated base station subsystem.

FIG. 1 is a high level block diagram of a wireless communication network including a distributed antenna system (DAS) 100 with an integrated base station subsystem. The distributed antenna system 100 is communicatively coupled to an Internet Protocol (IP) network 101 via one or more backhaul links 103 and to a first one or more base stations 107 via one or more base station links 109.

In the IP network 102 data is sent between entities using the Internet Protocol. Accordingly, the IP network 102 is a packet based network. In an example, IP data (that is, packets of IP data) is communicated between the DAS 100 and the IP network 102.

The IP network 102 can comprise carrier networks for one or more carriers of wireless services, and the DAS 100 can be, for example, coupled to multiple wireless service providers' (i.e., carriers') networks within the IP network 102. The IP network 102 communicatively couples the DAS 100 to other communication systems such as other base stations 105, the public switched telephone network (PSTN) 108, the Internet 110, the IP multimedia system (IPM) 112, and/or other networks.

IP data from the IP network 102 is provided to the DAS 100 for generating wireless RF communication signals for wireless devices. Likewise, the DAS 100 receives wireless RF communication signals from wireless devices, and generates IP data corresponding to the wireless RF signals. The IP data is sent to the IP network 102 over the backhaul links 103 for distribution to the appropriate entity (for example, base station 105, PSTN 108, Internet 110, IPM 112, and/or other network). In some examples, the IP data from the IP network 102 can be converted to a different (for example, proprietary) structure for interfacing with the DAS 100.

Within the IP network 102, the backhaul links 103 can couple the DAS 100 to one or more IP access gateways 114, such as a home node B (HNB) or home evolved node B (HENB) IP gateway. An IP access gateway 114 can interface the DAS 100 with the rest of the IP network 102 and provide access control to a carrier network within the IP network 102. For example, the IP access gateways 104 act as an interface between the DAS 100 and a radio network controller (RNC) 116, serving gateway (S-GW) 118, mobile management mobility (MME) 120, and serving general packet radio services (GPRS) support node (SGSN) 122. In examples where the backhaul is trusted, an IP access gateway 102 may not be used and the DAS 100 can interface directly with another entity (other than the IP access gateway 102) within the IP network 102. In such an example, the DAS 100 can be coupled directly to the RNC 116, serving gateway 118, MME 120, SGSN 122. The DAS 100 could also be coupled directly to other base stations 105.

Some example entities within an IP network 102 are shown. The example shown in FIG. 1 includes a mobile switching center (MSC) 124 and/or gateway mobile switching center (G-MSC) 126 to interface with the PSTN 108. The MSC 124 and/or gateway MSC 126 can provide circuit-switching to the public switched telephone network (PSTN) 108. The PSTN 108 can be used, for example, for voice communications. For example, one or more wireless devices (for example, mobile telephones, mobile computers, and/or combinations thereof such as personal digital assistants (PDAs) and smartphones) can make a voice call to a land line telephone via the PSTN 108. The IP network 102 can also include SGSN 112 and a gateway GPRS support node (GGSN) 128 which provide an interface to the Internet 110. The GGSN 128 can also connect to other networks such as a local area network (LAN) or a wide area network (WAN). The IP network 102 can also include a serving gateway 118, mobile management mobility entity (MME) 120, and PDN gateway 130 for interfacing with the IPM 112.

In the downstream direction, the DAS 100 is configured to receive IP data (e.g., IP packets) from the IP network 102 (for example, via the IP gateway 114) over the backhaul links 103 and to generate and distribute wireless communications signals for one or more wireless devices from the IP data. In the upstream direction, the DAS 100 is configured to receive wireless communication signals at one or more antennas and to convert the wireless communication signals into IP data representative of the wireless signals for the IP network 102. In the exemplary embodiment shown in FIG. 1, the DAS 100 generates and receives a plurality of bi-directional radio frequency bands. Each such radio frequency band is typically used to communicate multiple logical bi-directional RF channels.

In addition to the backhaul links 103, the DAS 100 can also be coupled to one or more base stations 107 via the one or more base station links 109. Communication between the one or more base station links 109 can occur as a radio frequency (RF) signal or as a baseband digital signal as discussed below. The one or more base stations 107 can be coupled to the IP network 102 via another backhaul link 111. In the downstream direction, the DAS 100 can receive an RF or baseband digital signal from a base station 107 and distribute the signal signals for one or more wireless devices. In the upstream direction, the DAS is configured to pass wireless signals corresponding to an RF channel of a base station 107 from one or more wireless devices to the base station 107.

Notably, the DAS 100 can be configured to operate concurrently on both data that is upstream of the baseband processing, such as IP data communicated with the IP network 102, as well as signals that are downstream from the baseband processing, such as the RF or baseband digital signals from the base station 107. More detail on this is provided below with respect to FIGS. 2-4.

The techniques described herein with respect to the DAS 100 are especially useful in connection with wireless communications that use licensed radio frequency spectrum, such as cellular radio frequency communications. Examples of such cellular RF communications include cellular communications that support one or more of the second generation (2G), third generation (3G), and fourth generation (4G) Global System for Mobile communication (GSM) family of telephony and data specifications and standards, one or more of the second generation (2G), third generation (3G), and fourth generation (4G) Code Division Multiple Access (CDMA) family of telephony and data specifications and standards, and/or the WIMAX family of specification and standards. In the particular exemplary embodiment described here in connection with FIG. 1, the DAS 100 is configured to handle two cellular bi-directional radio frequency bands. In other embodiments the DAS 100 is used with wireless communications that make use of unlicensed radio frequency spectrum such as wireless local area networking communications that support one or more of the IEEE 802.11 family of standards. In other embodiments, combinations of licensed and unlicensed radio frequency spectrum are distributed. In one embodiment, the DAS 100 is configured for use with a MIMO protocol. The DAS can be configured for use in at least one of: in-building applications, outdoor applications, enterprise applications, public safety applications, and military applications.

In the exemplary embodiment described here in connection with FIG. 1, the DAS 100 is configured to generate and distribute wireless communications that use frequency division duplexing to implement the logical bi-directional RF bands. In other embodiments, the DAS 100 is configured to communicate at least some wireless communications that use other duplexing techniques (such as time division duplexing, which is used, for example, in some WIMAX implementations).

Since the DAS 100 is configured to use frequency division duplexing in this exemplary embodiment, each of the bi-directional radio frequency bands distributed by the DAS 100 include a separate radio frequency band for each of two directions of communications. One direction of communication is from the IP network 102 or base station 107 though the DAS 100 to a wireless device and is referred to here as the "downstream" or "downlink" direction. The other direction of communication is from a wireless device through the DAS 100 to the IP network 102 or base station 107 and is referred to here as the "upstream" or "uplink" direction. Each of the distributed bi-directional radio frequency bands includes a "downstream" band in which downstream RF channels are communicated for that bi-directional radio frequency band and an "upstream" band in which upstream RF channels are communicated for that bi-directional radio frequency band. The downstream and upstream bands for a given bi-directional radio frequency band need not be, and typically are not, contiguous.

In the exemplary embodiment shown in FIG. 1, the DAS 100 includes a host unit 104 and one or more remote units 106. The DAS 100 shown in FIG. 1 uses one host unit 104 and six remote units 106, though it is to be understood that other numbers of host units 104 and/or remote units 106 can be used. As shown in FIG. 1 a remote unit 106 can be a destination for a downstream signal from the host unit 106 and can radiate a wireless RF signal from an antenna associated therewith based on the downstream signal. Such a remote unit 106 with an associated antenna is referred to herein as a "remote antenna unit" or "RAU" and can function to transmit/receive wireless RF signals over accompanying antenna to wireless devices. Each such remote antenna unit 106 is communicatively coupled to a respective antenna over a respective coaxial cable (such as a 50 Ohm coaxial cable). In some embodiments, a remote unit 106 is implemented as a remote unit, such as an indoor or outdoor remote unit commercially available from TE Connectivity. The remote unit is also described in U.S. patent application Ser. No. 11/627,251, assigned to ADC Telecommunications, Inc., published in U.S. Patent Application Publication No. 2008/0181282, and incorporated herein by reference.

A remote unit 106 can also be a distribution point that can receive a downstream signal from the host unit 104 and can provide further downstream signals based on the downstream signal from the host unit 104 to multiple other remote units 106. In one implementation of such an embodiment, groups of the remote units 106 are configurable for local joint beamforming and/or joint transmission groups of cells.

In the exemplary embodiment shown in FIG. 1, the host unit 104 is communicatively coupled to the remote units 106 over a transport communication medium or media. The transport communication media can be implemented in various ways. For example, the transport communication media can be implemented using respective separate point-to-point communication links, for example, where respective optical fiber or copper cabling is used to directly connect the host unit 104 to each remote unit 106. One such example is shown in FIG. 1, where the host unit 104 is directly connected to some remote units 106 using a respective optical fiber 108. Also, in the embodiment shown in FIG. 1, a single optical fiber 108 is used to connect the host unit 104 to the remote unit 106, where wave division multiplexing (WDM) is used to communicate both downstream and upstream signals over the single optical fiber 108. In other embodiments, the host unit 104 is directly connected to the remote unit 106 using more than one optical fiber (for example, using two optical fibers, where one optical fiber is used for communicating downstream signals and the other optical fiber is used for communicating upstream signals). Also, in other embodiments, the host unit 104 is directly connected to one or more of the remote units 106 using other types of communication media such a coaxial cabling (for example, RG6, RG11, or RG59 coaxial cabling), twisted-pair cabling (for example, CAT-5 or CAT-6 cabling), or wireless communications (for example, microwave or free-space optical communications).

Figure 2:
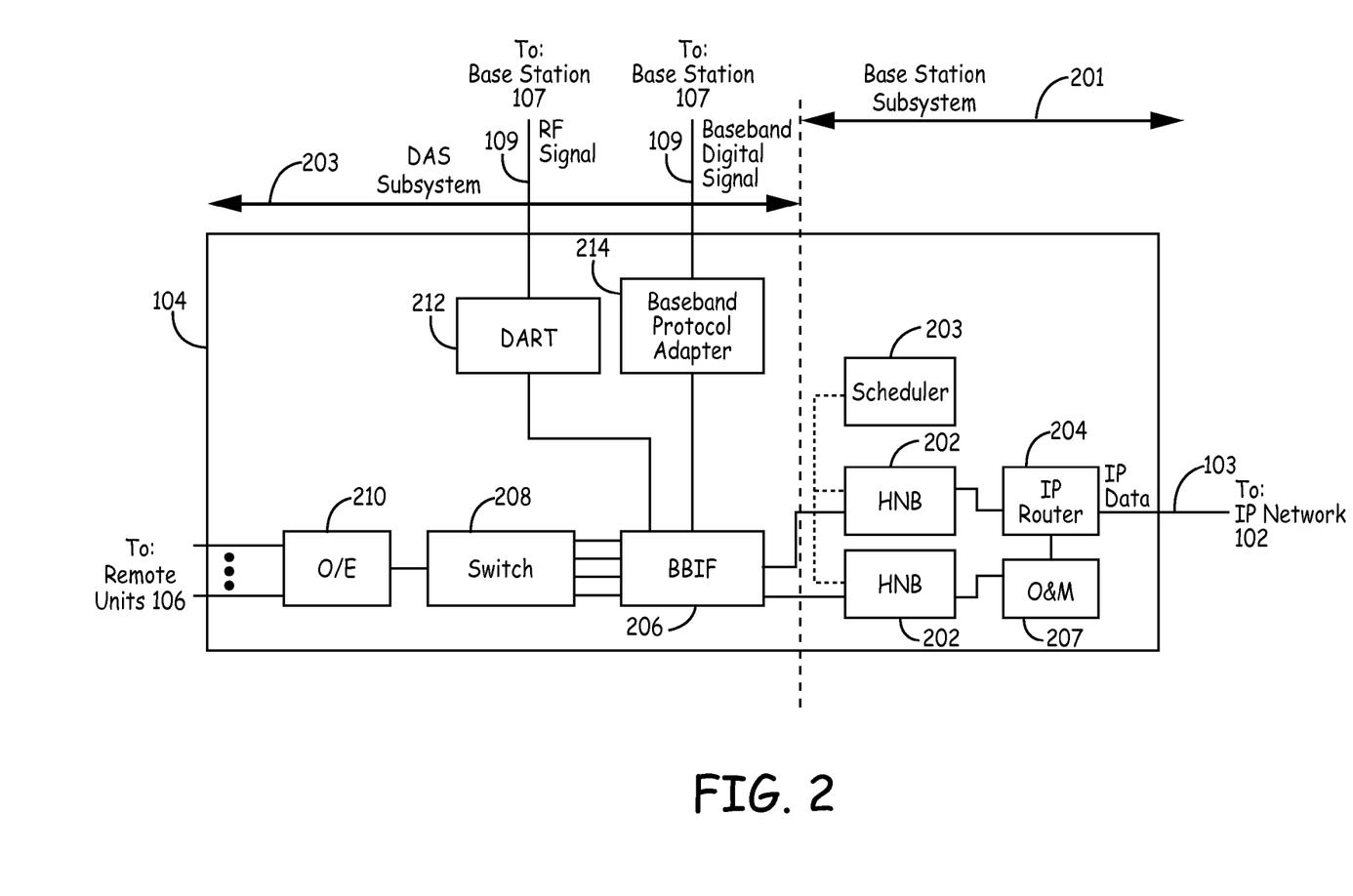
FIG. 2 is a block diagram of an example host unit for use in the DAS of FIG. 1.

FIG. 2 is a block diagram of an example host unit 104 for use in the DAS 100. The host unit 104 comprises a base station subsystem 201 that is integrated together with a DAS subsystem 203 as a single entity. The base station subsystem 201 receives IP data from the IP network 102 and performs baseband processing on the IP data to generate a digital representation of one or more RF signals to be wireless propagated to a wireless device(s). The base station subsystem 201 also performs baseband processing on digital representations of (wireless) RF signals received from a wireless device and generates IP data based thereon for sending over IP network 102. Such a digital representation of an RF signal comprises digital samples of the RF signal at baseband, and a signal including such digital samples of an RF signal at baseband is referred to herein as a baseband digital signal. The digital samples can optionally comprise in-phase digital baseband data and quadrature digital baseband data. Accordingly, the base station subsystem 201 outputs to, and receives from, the DAS subsystem 203 one or more baseband digital signals. Notably, when generating a baseband digital signal from IP data, the base station subsystem 201 does not generate an RF signal. The base station subsystem 201 merely generates a digital representation of an RF signal and provides the digital representation as a baseband digital signal to the DAS subsystem 203. An RF signal is then generated from the baseband digital signals downstream of the base station subsystem 201, such as in a remote unit 106.

The DAS subsystem 203 receives the one or more baseband digital signals in parallel from the base station subsystem 201 and forms one or more serial data streams therefrom for transmission to the remote units 106. Such a serial data stream contains digital representations of an RF channel. In an example, the digital representations of the RF channel are digital samples of the RF channel at baseband which correspond to the digital samples of the baseband digital signals; however, in a serial stream the data is formatted for (high speed) serial communication to the remote units 106 as discussed below. In another example, such a serial data stream contains intermediate frequency (IF) samples of the RF channel that are formatted for (high speed) serial communication to the remote units 106. In the upstream, the DAS subsystem 203 receives serial data streams from the remote units 106 and converts the serial data stream into one or more (parallel if multiple) baseband digital signals for the base station subsystem 201. As mentioned above, the base station subsystem 201 and the DAS subsystem 203 are integrated together into a single entity.

The base station subsystem 102 includes one or more base transceiver stations (BTSs) 202 that perform baseband processing as discussed above on the IP data from the IP network 102 and on the baseband digital signals from the DAS subsystem 203. In the example shown in FIG. 1, each BTS 202 is coupled to an IP access gateway 114 via an IP router 204. The IP router 204 receives IP data from the IP network 102 (for example, from an IP access gateway 114) and routes the IP data to the appropriate one or more of the BTSs 202. In the upstream, the IP router 204 receives IP data from the one or more BTSs 202 and provides the IP data to the appropriate entity in the IP network 102. An operations and maintenance module 207 can be coupled to the IP router 204.

In an example, each of the BTSs 202 is configured to process a single RF channel (for example, a 20 MHz channel) supporting multiple users (for example, 16, 32, or 64 users). In the downstream direction, each BTS 202 receives IP data corresponding to its RF channel from the IP router 204. Each BTS 202 performs baseband processing on the IP data from the IP network 102 and places the IP data onto its respective RF channel. Each BTS 202 is configured to output, and receive as input, respective digital baseband signals as discussed above. Each BTS 202 generates a baseband digital signal from the IP data, wherein the baseband digital signal is a representation of an RF signal at baseband. In an example, the baseband digital signals can conform to a standard for baseband digital signals, for example, the Open Base Station Architecture Initiative (OBSAI) or the common public radio interface (CPRI). In an example, the baseband digital signals can conform to a proprietary protocol. In an example, the BTSs 202 comprise a plurality of home node B (HNB) base transceiver stations and/or a plurality of enhanced home node B (HENB) base transceiver stations. In one implementation of such an embodiment, each of the plurality of HNB base transceiver stations implements at least one third-generation (3G) protocol and/or each of the plurality of HENB base transceiver stations implements at least one fourth-generation (4G) protocol.

In an example, the host unit 104 can also include a scheduler 203 to control the BTSs 202. The scheduler 203 can be an integrated part of the host unit 104 and, as such, is co-located with the BTSs 202. The scheduler can be coupled to the BTSs 202 via a control interface. In an example, the scheduler 203 can implement functions of a base station controller to control operation of the BTSs 202. In one implementation of such an embodiment, the scheduler 203 is implemented as a low-latency joint scheduler (LUS). In one example, the scheduler 203 implements at least one of semi-static scheduling and dynamic scheduling.

Each BTSs 202 can provide the baseband digital signals to a baseband interface (BBIF) 206. The baseband digital interface 202 can provide an interface between the one or more BTSs 102 and a switching unit 206. Baseband digital signals, as discussed above, can be sent between each BTS 102 and the switching unit 206. In an example, the BBIF 206 is a passive backplane that the baseband digital signals pass through between the BTS 102 and the switching unit 206.

Switching unit 208 can provide bi-directional conversion between multiple baseband digital signals one or more serial data streams for the remote units 106. The switching unit 206 can receive from, and output to, each BTS 202 respective baseband digital signals. In the downstream, the switching unit 206 can receive baseband digital signals from the one or more BTSs 206 and provide one or more serial data streams to the remote units 106. In the upstream, the switching unit 208 can receive one or more serial data streams from the remote units 106 and provide baseband digital signals to their respective BTSs 202.

In an example, each serial data stream communicated between the host unit 104 and one or more remote units 106 is formatted into a plurality of time slots. The time slot can be further organized into words, where each word includes a defined number of time slots. In the downstream, the switching unit 208 can format each baseband digital signal into data formatted for a time slot of a serial data stream. For example, the switching unit 208 can capture "slices" of a baseband digital signal (a representation of an RF channel), where each slice corresponds to the RF signal during a time period of the corresponding RF channel. The switching unit 208 can then format each "slice" into data formatted for a time slot of the one or more serial data streams. In examples including multiple BTSs 102, a plurality of baseband digital signals is provided to the baseband interface 202 and the switching unit 208 in parallel. The switching unit 208 can capture slices of each of these baseband digital signals and convert each into data formatted for a time slot of the one or more serial data streams.

In addition to BTSs 202, the BBIF 206 can provide an interface for baseband digital signals from other components. For example, the DAS subsystem 203 can also include one or more digital to analog RF transceivers (DART) 212. A DART 212 is communicatively coupled to a base station 107 that is distinct from the host unit 104 via a base station link 109. A DART 212 provides bi-directional conversion to/from RF signals from/to baseband digital signals. In the downstream direction, a base station 107 receives data (e.g., IP data from the IP network 102) corresponding to a RF signal to be transmitted to a wireless device. The base station 107 generates the RF signal for transmission to the wireless device. A DART 212 takes as input the RF signal from the base station 107 and converts the analog signal to a baseband digital signal by taking digital samples of the RF signal. In an example, each DART 212 operates on a single RF channel. In the upstream direction a DART 212 receives a baseband digital signal from the switch 208, converts it to an RF signal, and sends the RF signal to the base station 107. The base station 107 can receive the RF signal and perform baseband processing thereon. Accordingly, the signals sent between a base station 107 and the DART 212 are not IP data as discussed above; instead they are RF signals and baseband processing is performed by the base station 107.

Figure 3:
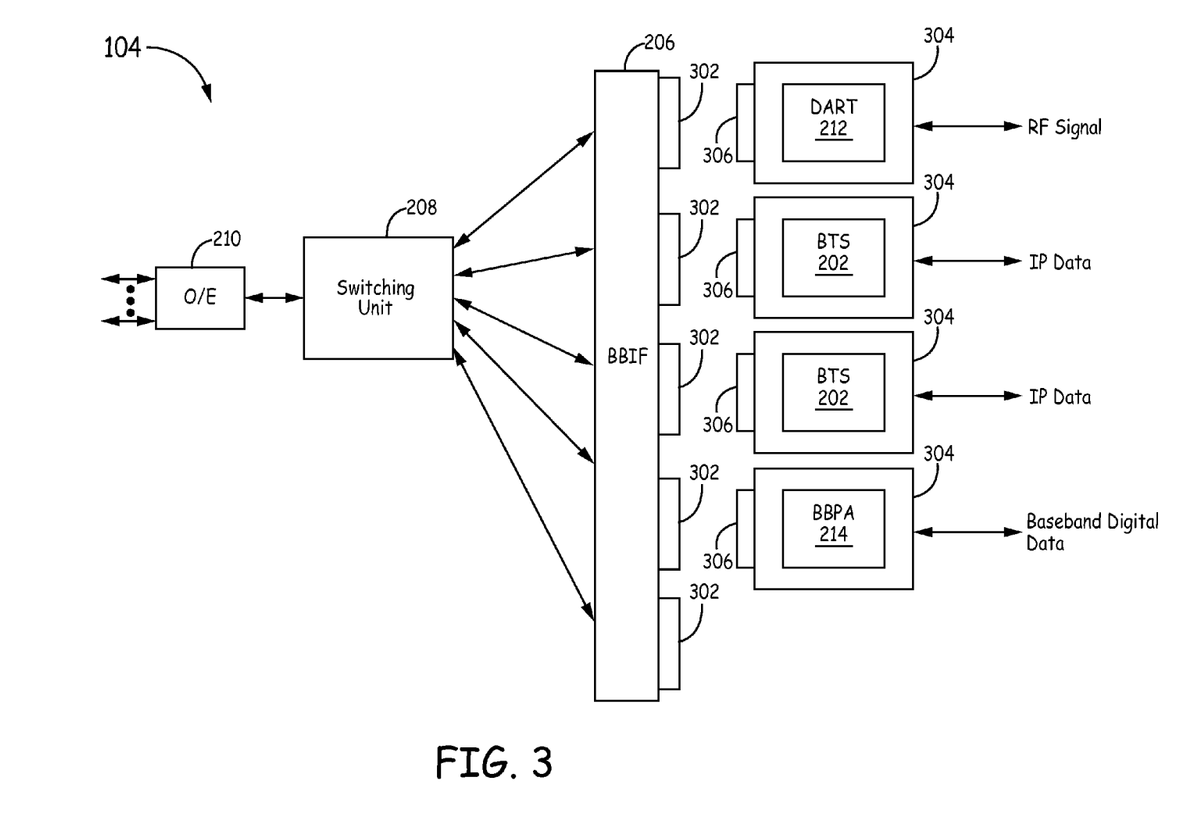
FIG. 3 is a diagram of another example host unit for use in the DAS of FIG. 1.

Each DART 212 is configured to operate on a single RF channel, and different DARTs 212 on different RF channel modules 304 installed in the host unit 104 can be configured to operate on different channels (frequency bands), use different communication protocols, and/or correspond to different service providers'. Each DART 212, however, converts to and from a baseband protocol (for example, the common baseband protocol) for the BBIF 206. As an example a first DART 212 can be configured to operate on 850 MHz cellular transmissions, which a second DART 212 can be configured to operate on 1900 MHz PCS signals. Some of the other options for a DART 212 include Nextel 800 band, Nextel 900 band, PCS full band, PCS half band, BRS, WiMax, LTE, and the European GSM 900, DCS 1800, and UMTS 2100.

In some embodiments, DART 212 is implemented with a DART module commercially available from TE Connectivity as part of the FlexWave™ line of products. The DART module is also described in U.S. patent application Ser. No. 11/627,251, assigned to ADC Telecommunications, Inc., published in U.S. Patent Application Publication No. 2008/0181282, and incorporated herein by reference.

The BBIF 206 can also interface between the switching unit 208 and a baseband protocol adapter 214. The baseband protocol adapter 214 can be communicatively coupled to a base station 107 via one or more base station links 109 and can bi-directionally communicate baseband digital signals therebetween. In an example, the baseband protocol adapter 214 can be configured to convert between a first communication protocol used by the base station 107 and a second baseband protocol used by the switching unit 208. In other examples, the baseband protocol adapter 214 can be a passive device that passes baseband digital signals between the base station 107 and the switching unit 208 through the BBIF 206.

Although a single DART 212, single baseband protocol adapter 214, and two BTSs 202 are shown in FIG. 2, the host unit 104 can include any number of DARTs 212, baseband protocol adapters 214 and BTSs 202. Moreover, although the host unit 104 in FIG. 1 is shown as including a DART 212, baseband protocol adapter 214, and (two) BTSs 202, the host unit 104 need not include each of these types (DART 212, baseband protocol adapter 214, and BTS 202) of components and can include only one or two of these types of components.

In an example, the switching unit 208 can implement a defined, common baseband digital signal protocol for the baseband digital signals from each BTS 202, DART 212, and baseband protocol adapter 214. That is, the switching unit 208 can implement a baseband digital signal protocol to which all BTSs 202, DARTs 212, and baseband protocol adapters 214 of the host unit 104 conform. The common baseband digital signal protocol can be one of the standards or a proprietary protocol as discussed above. Using a common baseband digital signal protocol for each BTS 202, DART 212, and baseband protocol adapter 214 enables the switching unit 208 to multiplex signals from a BTSs 102, DARTs 212, and baseband protocol adapters 214 together onto one or more than one serial data stream and sent over the same transport medium to one or more remote units 106. Moreover, the common baseband digital signal protocol can enable different frequency bands, wireless communication protocols, as well as services from different wireless service providers, to be multiplexed together onto one or more serial data streams and sent over the same transport medium to one or more remote units 106. In such an example, each BTS 102, DART 212, and baseband protocol adapter 214 can provide and receive baseband digital signals conforming to the common baseband digital signal protocol regardless of the frequency band, communication protocol, and/or service. In this way, the DAS 100 can operate on multiple distinct frequency bands, wireless communication protocols, services, and input types (IP data, RF signals, baseband digital signals) concurrently.

In such an example, each BTS 202 can convert between the common baseband digital signal protocol for the switching unit 208 and IP data for the IP network 102. The DART 212 can convert between RF signals and the common baseband digital signal protocol. The baseband protocol adapter can either pass signals through from a base station 107 that are conform to the common baseband digital signal protocol or can convert between baseband digital signals having a format for the base station 107 and baseband digital signals conforming to the common baseband digital signal protocol.

In other examples, the switching unit 208 is configured to send and receive baseband digital signals having different baseband digital signal protocols with different components (BTS(s) 202, DART(s) 212, baseband protocol adapter(s) 214). In such an example, the switching unit 208 can be configured to convert between the disparate baseband digital signal protocols and a common baseband protocol. In another embodiment of such an example, the switching unit 208 does not convert the disparate baseband digital signal protocols and sends and receives the disparate baseband digital signal protocols (as serial data streams) to and from the remote units 106.

As mentioned above, the switching unit 208 can multiplex multiple baseband digital signals (in particular, the data formatted for time slots generated therefrom) into one or more serial data streams for the remote units 106. In some examples, the parallel baseband digital signals from all the BTSs 202, DARTs 212, and baseband protocol adapters 214 of the host unit 104 are multiplexed together into a single serial data stream. In other examples, multiple serial data streams are generated, where each serial data stream can correspond to one or more of the parallel baseband digital signals. For example, the switching unit 208 can be configured to route each of the baseband digital signals to a respective subset of the remote units 106. Moreover, there need not be a one-to-one relationship between a baseband digital signal and a serial data stream. In other words, the switching unit 208 can generate multiple copies of data formatted for a time slot from one or more of the baseband digital signals and place a first copy of the data on a first serial stream, a second copy of the data on a second serial stream and so on. In this manner, the switching unit 208 can generate one or more serial data streams, wherein each serial data stream can include data from any one or more of the BTSs 202, DARTs 212, and baseband protocol adapters 214. The switching unit 208 can optionally be configured to perform protocol conversion between a first baseband protocol used by a BTS 202, DART 212, or baseband protocol adapter 214 and a second baseband protocol used by the plurality of remote units.

In addition to controlling which of the serial data streams data from a baseband digital signal is placed on, the switching unit 208 can also control which time slot within a given serial data stream that a particular time slot of data is placed. In an example, each time slot of the downstream serial data stream(s) can be allocated to one or more remote units 106, and the switching unit 208 controls which remote units 106 receive which baseband digital signals based on the time slot in which the data from the baseband digital signals is placed. For example, if time slots 1-5 of each word of a serial data stream are allocated to a first remote unit 106, the switching unit 208 can place a time slot of data from a baseband digital signal corresponding to that remote unit 208 into each of time slots 1-5 of a given word.

In some examples the allocation of time slots is controlled by the host unit 104. In such examples, the switching unit 208 can change (e.g., add, eliminate, or swap) which remote units 106 that receive data from a particular baseband digital signal by changing which time slot the data is placed in accordingly. In this way, the switching unit 208 can increase or decrease capacity for a given remote unit 106 by allocating more or fewer slots to the remote unit 106. In other examples, the time slots for a particular remote unit 106 are not under the control of the switching unit 208 and, instead, are configured manually. In embodiments including multiple serial data streams, the switching unit 208 can also control which remote units 106 receive data from a particular baseband digital signal by controlling which of the multiple serial data streams receive the data as discussed above.

Using the above, the switching unit 208 can dynamically control which remote units 106 receive which baseband digital signals in order to manage capacity changes over different areas or for other reasons. Moreover, this control is effective for multiple different frequency bands, communication protocols, and/or services concurrently.

In an example, the switching unit 208 is implemented as a space-frequency switch (SFS). In some embodiments, switching unit 208 is implemented with a Serialized RF (SeRF board) commercially available from TE Connectivity as part of the FlexWave™ line of products. The SeRF board is also described in U.S. patent application Ser. No. 11/627, 251, assigned to ADC Telecommunications, Inc., published in U.S. Patent Application Publication No. 2008/0181282, and incorporated herein by reference.

The host unit 104 can also include an electronic-to-optical (E/O)/optical-to-electrical (O/E) converter 210 for converting the serial data stream(s) from the switching unit into an optical signal for transmission over a fiber optic cable(s) to one or more RAUs 106 and/or intermediary devices 107.

A wavelength division multiplexer (WDM) (not shown) can also be used to multiplex both the downlink and uplink optical signals onto a single fiber when only a single optical fiber is used to couple one or more of the remote units 106 with the host unit 104.

In the upstream, the O/E converter 210 can convert optical signals from the fiber optic cable(s) into an electrical signal. The serial data stream received from the remote units 106 can be provided to the switching unit 208. The switching unit 208 can demultiplex the serial data stream to form multiple baseband digital signals for the BTS(s) 202, DART(s) 212, and baseband protocol adapter(s) 214. The switching unit 208 can route each of a baseband digital signals to a subset of the base transceiver stations 202, DART(s) 212, and baseband protocol adapter(s) 214. The switching unit 208 can generate multiple parallel baseband digital signals, one per BTS 202, DART 212, and baseband protocol adapter 214. In some embodiments, switching unit 208 aggregates uplink signals associated with a downlink simulcast signal and routes the aggregated uplink signal to its corresponding BTS 202, DART 212, or baseband protocol adapter 214. As discussed above, the serial data stream can be formatted into words comprising a plurality of time slots. Each time slot of the upstream serial data stream(s) are allocated to a BTS 202, DART 212, or baseband protocol adapter 214. Accordingly, the baseband digital signal provided to each BTS 202, DART 212, or baseband protocol adapter 214 can correspond to the data in the time slots of the upstream serial data stream(s) that are allocated to the particular BTS 202, DART 212, or baseband protocol adapter 214.

Similar to the downstream, in some examples switching unit 208 can control the upstream bandwidth of each remote unit 106 based on the time slots in the upstream serial data stream(s) allocated to the remote unit 106. In other examples, the allocation of time slots for a particular remote unit 106 is not under the control of the switching unit 208 and, instead, is configured manually. The upstream baseband digital signals from the switching unit 208 are sent through the baseband interface 206 and are received at their respective BTS 202 DART 212, or baseband protocol adapter 214.

Each BTS 202 processes the received baseband digital signal and generates IP data which is sent to the IP router 204. The IP router 204 routes the IP data to the appropriate entity in the IP network 102 via a backhaul link 103. Each DART 212 converts its respective baseband digital signal to an RF signal and sends the RF signal to a base station 107 via a base station link 109. Each baseband protocol adapter 214 converts the baseband digital signal to another baseband digital signal protocol or otherwise passes the baseband digital signal to a base station 107 via a base station link 109.

In one example, the host unit 104 is configured to intercept UE reports of cell measurements. In one implementation of such an embodiment, wherein the DAS 100 further comprises a measurement receiver in each remote unit 106 to measure path loss to neighbor remote units. In one implementation of such an embodiment, the DAS 100 is configured to monitor traffic and measurement data passing through the system in order to estimate traffic load per remote unit and/or traffic load per user device. The traffic load estimates can optionally be used by the switching unit 208.

FIG. 3 is an example diagram of a host unit 104. In the example of FIG. 3, the host unit 104 is a modular wireless platform that enables a system facilitator to easily and inexpensively adapt their wireless system for use with different data transport mechanisms, frequency bands, communication technologies, and intelligence distribution. The host unit has a modular design and a baseband interface 206 that allow RF channel modules 304 to be physically installed and removed to adapt to the needs of the service providers. The host is designed around the baseband interface 206 and a switching unit 208 that can operate with baseband digital signals corresponding to different frequency bands and communication protocols, as well as services from different wireless service providers and different RF channel modules 304.

In the example shown in FIG. 3, baseband interface 202 is a passive backplane including a plurality of BBIF connectors 302 (for example, edge connectors). Each BBIF connector 302 is configured to have inserted therein an RF channel module 304 and is configured to electrically couple an inserted RF channel module 304 to the switch 208. In an example, the RF channel module 304 is a circuit card comprising a printed circuit board having an appropriate module connector 306 for mating with a BBIF connector 302. In an example, the module connector 306 is a dual inline edge connector. This enables an RF channel module 304 configured for use with the baseband interface 202 to be physically inserted and removed from the host unit 104. The RF channel module 304 is pluggable and removable and mating a module connector 306 with a BBIF connector 302 forms a non-permanent electrical connection between the RF channel module 304 and the BBIF 206. The connection is non-permanent in that the connection can be made and removed in the field without damaging the module connector 306 or the BBIF connector 302 and the electrical connection is based on physical contact between conductors on the module connector 306 and conductors on the BBIF connector 304. This non-permanent connection does not include a connection made with solder or the like or a connection made by physically deforming one or both of the connectors, such as when a connector is crimped. The BBIF 206 includes multiple BBIF connectors 302 for coupling with multiple RF channel modules 304. Although five BBIF connectors 302 are shown in FIG. 3 it should be understood that other numbers of BBIF connectors 302 can be included in BBIF 206.

When an RF channel module 304 is inserted into a BBIF connector 302 (that is, when the module connector 306 is mated with the BBIF connector 304), the RF channel module 304 is electrically coupled to the backplane and can output signals to, and receive signals from, the switching unit 208.

FIG. 3 illustrates four RF channel modules 304 of three different types. One type includes a DART 212 that is coupled to a base station 107 via a base station link 109 as discussed above. Another type of RF channel module 304 includes a BTS 202 that is coupled to an IP network 102 via a backhaul link 103 as discussed. Yet another type of RF channel module 304 includes a baseband protocol adapter 214 that is coupled to a base station 107 via a base station link 109. Other types of RF channel modules 304 may also be used.

As mentioned above, in some examples, the switching unit 208 implements a common baseband digital signal protocol. In such example, the components (e.g., BTS 202, DART 212, and baseband protocol adapter 214) within the different types of RF channel modules 304 are configured to provide and receive baseband digital signals with the switching unit 208 that conform to the common baseband digital signal protocol as discussed above. Different types of RF channel modules 304 can be inserted into different BBIF connectors 302 on the BBIF 206 at the same time. Thus, the BBIF 206 and switching unit 208 can inter-operate with different types of RF channel modules 304 concurrently. That is, the host unit 104 enables one or more RF channel modules 304 having a DART 212 thereon, one or more RF channel modules 304 having a BTS 202 thereon, and one or more RF channel modules 304 having a baseband protocol adapter 214 thereon can be installed (i.e., connected with the BBIF 206) concurrently. Accordingly, some of the multiple baseband digital signals sent through the BBIF 206 can correspond to a DART 212 that communicates with a base station 107 that is distinct from the host unit 104, and others can correspond to a BTS 202 that is integrated into the host unit 104. In this way, the host unit 104 is flexible and field re-configurable to different frequency bands, communication protocols, service providers', and for integration of a BTS 202 therein.

Figure 4:
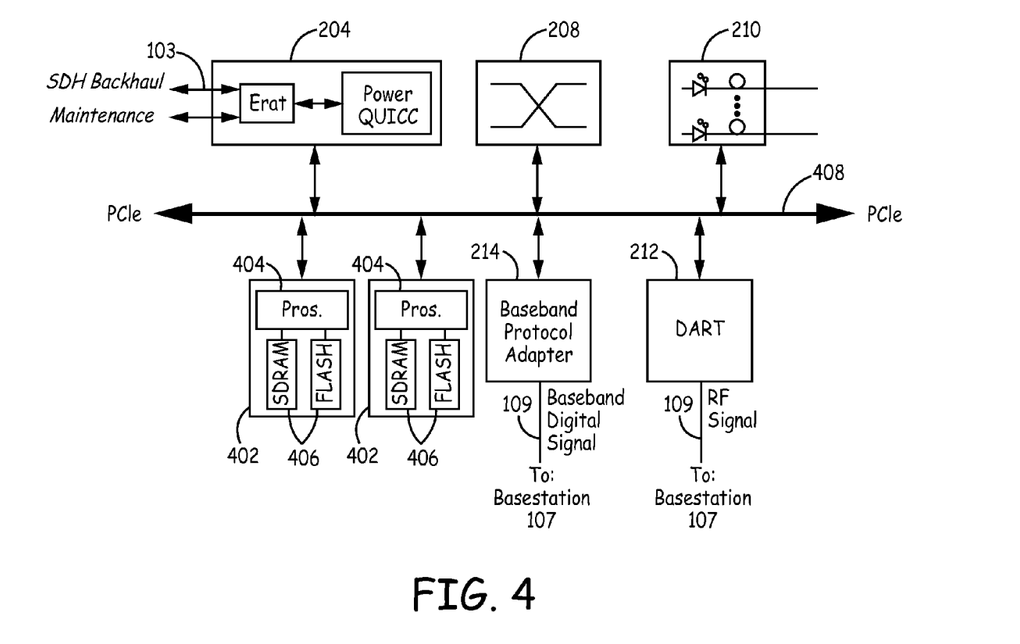
FIG. 4 is a diagram of yet another example host unit for use in the DAS of FIG. 1.

FIG. 4 is a block diagram of another example host unit 104. In this example, the host unit 104 includes a plurality of reconfigurable baseband modules 402 as the BTSs 202. That is, each reconfigurable baseband module 402 can be configures as a BTS 202 as described above with respect to FIG. 2. Each reconfigurable baseband module 402 includes a processing device 404 coupled to one or more memory devices 406 having instructions thereon to cause the processing device 404 to function as a BTS 202. In an example, the instructions can be modified to change the operation of the reconfigurable baseband module 402, such that the reconfigurable baseband module 402 operates on a different frequency band, communication protocols, and/or operates on services from different wireless service providers.

The reconfigurable baseband processors 402 are coupled to the IP router 204 over a communication bus 410. In an example, the bus 410 is a serial bus such as a peripheral component interconnect express (PCIE) bus; however, other bus protocols can be used. The reconfigurable baseband modules 402 are also coupled to the switching unit 208 through the bus 410. In addition, one or more DARTs 212 and one or more baseband protocol adapters 214 can also be coupled to the bus 410 for communication with the switching unit 208 and/or other components. The DART(s) 212 and baseband protocol adapter(s) 214 can function as described above with respect to FIG. 2 by communicating with a base station 107 through a base station link 109 and the switching unit 208 over the bus 410.

In this example, the BBIF 206 is a virtual interface and signals between the reconfigurable baseband module(s) 402, DART(s) 212, and baseband protocol adapter(s) 214, and the switching unit 208 can comprise baseband digital signals which, for example, can conform to a common baseband protocol. The switching unit 208 can perform switching operations as discussed above with respect to FIG. 2 and can communicate with the O/E converter 210 over the bus 410 for transmission and reception of signals to remote units 106. Accordingly, the bus 410 communicatively couples the reconfigurable baseband processor(s) 402, DART(s) 212, baseband interface adapter 214, IP router 204, and the switching unit 208 to one another. A system controller and other components can also be coupled to the bus 410.

A number of embodiments have been described. Nevertheless, it will be understood that various modifications to the described embodiments may be made without departing from the spirit and scope of the claimed invention.

The invention claimed is:

1. A method for generating and distributing wireless RF signals at a host unit in a distributed antenna system comprising the host unit which is communicatively coupled to a plurality of remote units, the method comprising:
   receiving Internet Protocol (IP) data at the host unit from an IP network entity, wherein the IP data corresponds to a plurality of radio frequency (RF) signals;
   routing at least a first subset of the IP data to a first base transceiver station within the host unit;
   routing at least a second subset of the IP data to a second base transceiver station within the host unit;
   at the host unit, baseband processing the at least a first subset of the IP data at the first base transceiver station to generate a first digital representation of a first RF signal for transmission from a remote unit to a wireless device, wherein the first digital representation of the first RF signal is at baseband;
   at the host unit, baseband processing the at least a second subset of the IP data at the second base transceiver station to generate a second digital representation of a second RF signal for transmission from a remote unit to a wireless device, wherein the second digital representation of the second RF signal is at baseband; and
   at the host unit, routing, as one or more downlink serial data streams, the first digital representation of the first RF signal to a first subset of the plurality of remote units and the second digital representation of the second RF signal to a second subset of the plurality of remote units.

2. The method of claim 1, comprising:
   at the host unit, receiving one or more uplink serial data streams from the plurality of remote units;
   extracting a third digital representation of a third RF signal from the one or more uplink serial data streams, wherein the third RF signal is an uplink counterpart to the first RF signal;
   extracting a fourth digital representation of a fourth RF signal from the one or more uplink serial data streams, wherein the fourth RF signal is an uplink counterpart to the second RF signal;
   routing the third digital representation of the third RF signal to the first base transceiver station;
   routing the fourth digital representation of the fourth RF signal to the second base transceiver station;
   baseband processing the third digital representation of the third RF signal with the first base transceiver station to generate IP data corresponding to the third RF signal;
   baseband processing the fourth digital representation of the fourth RF signal with the second base transceiver station to generate IP data corresponding to the fourth RF signal; and
   sending the IP data corresponding to the third RF signal and the IP data corresponding to the fourth RF signal from the host unit to the IP network entity.

3. The method of claim 2, wherein the first, second, third, and fourth digital representations of a respective RF signal comprise in-phase digital baseband data and quadrature digital baseband data.

4. The method of claim 2, wherein the IP network entity is an IP access gateway that controls access to a carrier network.

5. The method of claim 2, wherein the first, second, third, and fourth digital representations of a respective RF signal conform to a common baseband communication protocol.

6. The method of claim 5, wherein the common baseband communication protocol is the Open Base Station Architecture Initiative (OBSAI) or the common public radio interface (CPRI).

7. The method of claim 2, comprising:
   receiving at the host unit from an external base station, a fifth RF signal;
   generating a fifth digital representation of the fifth RF signal with a digital-to-analog RF transceiver (DART) module in the host unit;
   routing the fifth digital representation of the fifth RF signal to a third subset of the plurality of remote units;
   receiving at the host unit from the plurality of remote units, a sixth digital representation of a sixth RF signal, wherein the sixth RF signal is an uplink counterpart to the fifth RF signal;
   routing the sixth digital representation of the sixth RF signal to the DART module;
   generating the sixth RF signal from the sixth digital representation of the sixth RF signal with the DART module; and
   sending the sixth RF signal from the host unit to the external base station.

8. The method of claim 2, comprising:
   receiving at the host unit from an external base station, a seventh digital representation of a seventh RF signal;
   routing the seventh digital representation of the seventh RF signal to a fourth subset of the plurality of remote units;
   receiving at the host unit from the plurality of remote units, an eighth digital representation of the eighth RF signal, wherein the eighth RF signal is an uplink counterpart to the seventh RF signal;
   sending the eighth RF signal from the host unit to the external base station.

9. A method for generating and distributing wireless RF signals in a distributed antenna system having a host unit communicatively coupled to a plurality of remote units, the method comprising:

receiving downlink Internet Protocol (IP) data at the host unit from an IP network entity, wherein the downlink IP data corresponds to a plurality of radio frequency (RF) signals;

providing the downlink IP data to a plurality of base transceiver stations within the host unit;

each of the plurality of base transceiver stations generating a respective downlink digital representation of a respective RF signal;

routing each of the downlink digital representations of a respective RF signal to respective subset of the plurality of remote units as one or more downlink serial data streams;

receiving at the host unit from the plurality of remote units, one or more uplink serial data streams including a plurality of uplink digital representations of respective RF signals;

routing each of the plurality of uplink digital representations of respective RF signals to a respective base transceiver station of the plurality of base transceiver stations;

generating uplink IP data from the plurality of uplink digital representations of respective RF signals with the plurality of base transceiver stations; and sending the uplink IP data to the IP network entity.

10. The method of claim 9, wherein the uplink and downlink digital representations of respective RF signals comprise in-phase digital baseband data and quadrature digital baseband data.

11. The method of claim 9, wherein the IP network entity is an IP access gateway that controls access to a carrier network.

12. The method of claim 9, wherein the uplink and downlink digital representations of respective RF signals conform to a common baseband communication protocol.

13. The method of claim 12, wherein the common baseband communication protocol is the Open Base Station Architecture Initiative (OBSAI) or the common public radio interface (CPRI).

14. The method of claim 9, comprising:

receiving at the host unit from an external base station, a first RF signal;

generating a first digital representation of the first RF signal with a digital-to-analog RF transceiver (DART) module in the host unit;

routing the first digital representation of the first RF signal to a subset of the plurality of remote units;

receiving at the host unit from the plurality of remote units, a second digital representation of a second RF signal, wherein the second RF signal is an uplink counterpart to the second RF signal;

routing the second digital representation of the second RF signal to the DART module;

generating the second RF signal from the second digital representation of the second RF signal with the DART module; and sending the second RF signal from the host unit to the external base station.

15. The method of claim 9, comprising:

receiving at the host unit from an external base station, a third digital representation of a third RF signal;

routing the third digital representation of the third RF signal to a second subset of the plurality of remote units;

receiving at the host unit from the plurality of remote units, a fourth digital representation of the fourth RF signal, wherein the fourth RF signal is an uplink counterpart to the third RF signal;

sending the fourth RF signal from the host unit to the external base station.

16. A method comprising:

receiving downlink Internet Protocol (IP) data at the host unit from an IP network entity, wherein the downlink IP data corresponds to a first radio frequency (RF) signal;

receiving a second RF signal at the host unit from an external base station;

at the host unit, baseband processing the IP data at a first base transceiver station to generate a first digital representation of the first RF signal for transmission from a remote unit to a wireless device, wherein the first digital representation of the first RF signal is at baseband;

at the host unit, generating a second digital representation of the second RF signal with a digital-to-analog RF transceiver (DART) module in the host unit; and at the host unit, routing, as one or more downlink serial data streams, the first digital representation of the first RF signal to a first subset of the plurality of remote units and the second digital representation of the second RF signal to a second subset of the plurality of remote units.

17. The method of claim 16, comprising:

at the host unit, receiving one or more uplink serial data streams from the plurality of remote units;

extracting a third digital representation of a third RF signal from the one or more uplink serial data streams, wherein the third RF signal is an uplink counterpart to the first RF signal;

extracting a fourth digital representation of a fourth RF signal from the one or more uplink serial data streams, wherein the fourth RF signal is an uplink counterpart to the second RF signal;

routing the third digital representation of the third RF signal to the first base transceiver station;

routing the fourth digital representation of the fourth RF signal to the DART module;

baseband processing the third digital representation of the third RF signal with the first base transceiver station to generate IP data corresponding to the third RF signal;

generating the fourth RF signal from the fourth digital representation of the fourth RF signal with the DART module; and sending the fourth RF signal from the host unit to the external base station;

sending the IP data corresponding to the fourth RF signal to the IP network entity.

18. The method of claim 17, wherein the first, second, third, and fourth digital representations of a respective RF signal comprise in-phase digital baseband data and quadrature digital baseband data.

19. The method of claim 17, wherein the IP network entity is an IP access gateway that controls access to a carrier network.

20. The method of claim 17, wherein the first, second, third, and fourth digital representations of a respective RF signal conform one of the Open Base Station Architecture Initiative (OBSAI) or the common public radio interface (CPRI).

\* \* \* \* \*